Dec. 24, 1935.  F. S. HODGMAN  2,025,054
COURSE CHANGING MEANS FOR AUTOMATICALLY STEERED SHIPS
Filed June 30, 1932  4 Sheets-Sheet 2
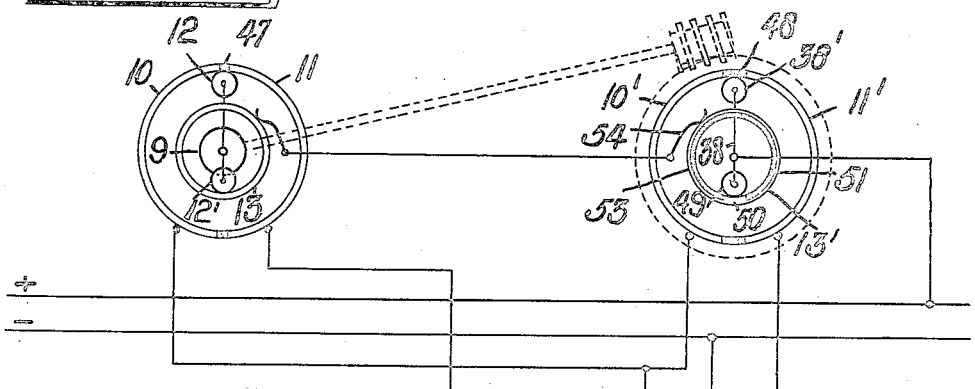
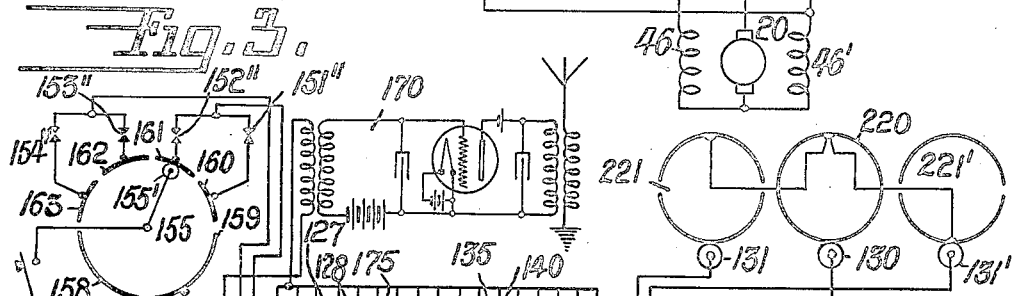
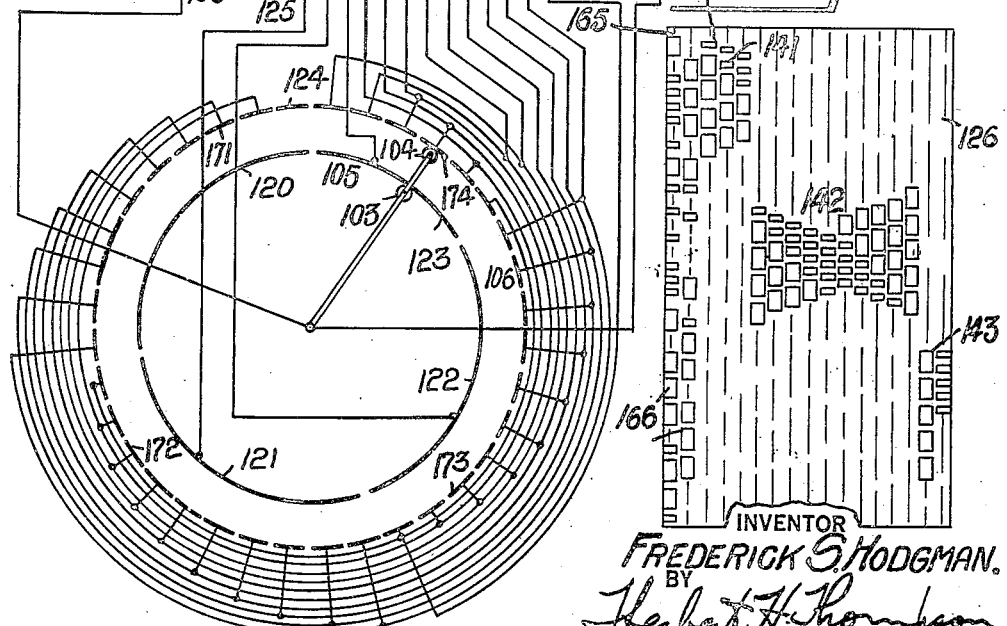
INVENTOR
FREDERICK S. HODGMAN.
BY
ATTORNEY.

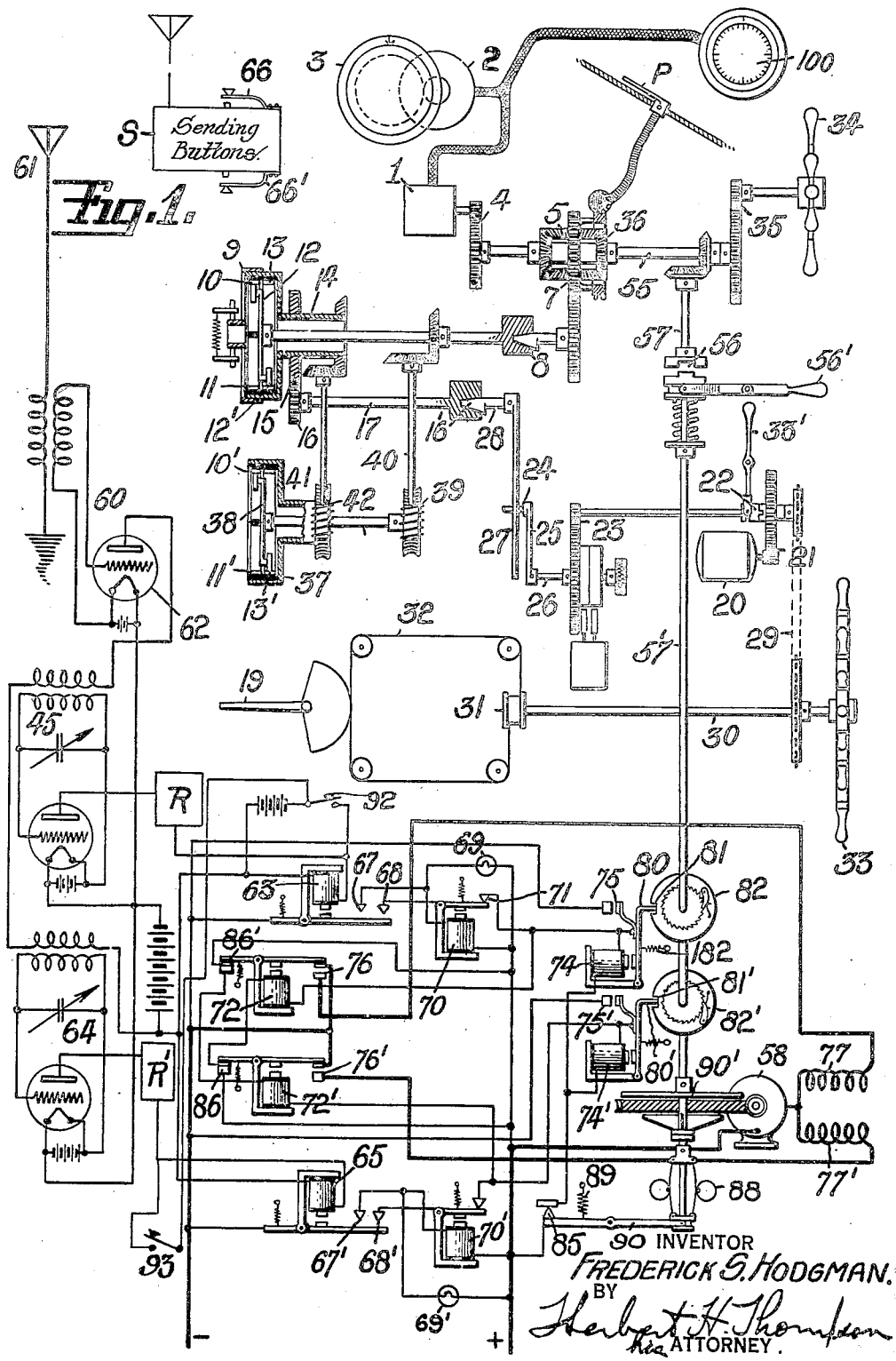

Dec. 24, 1935.  F. S. HODGMAN  2,025,054
COURSE CHANGING MEANS FOR AUTOMATICALLY STEERED SHIPS
Filed June 30, 1932   4 Sheets-Sheet 3
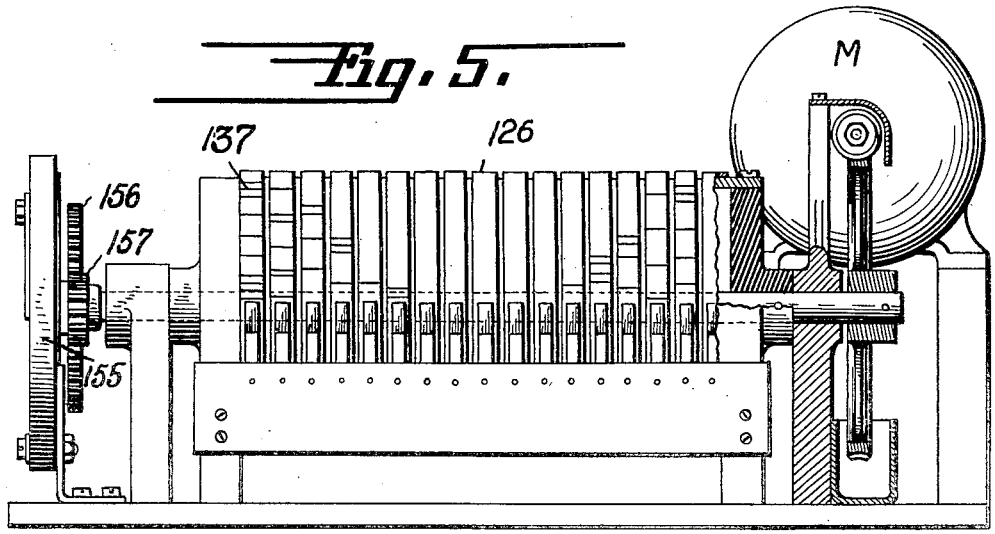
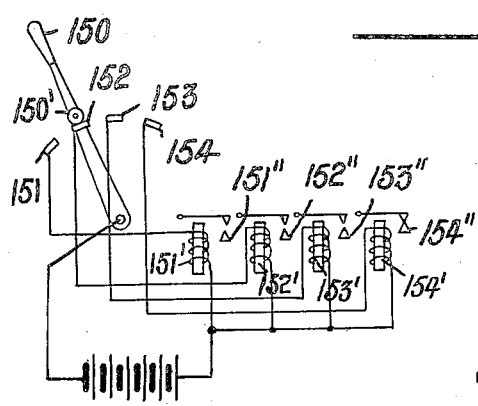
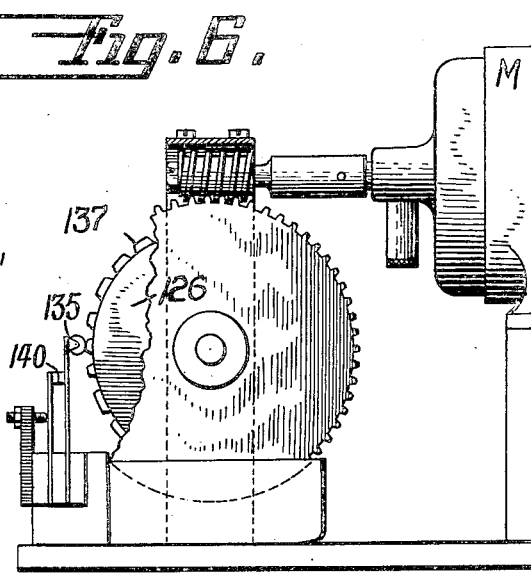
INVENTOR
FREDERICK S. HODGMAN.
BY
his ATTORNEY.

Dec. 24, 1935.  F. S. HODGMAN  2,025,054
COURSE CHANGING MEANS FOR AUTOMATICALLY STEERED SHIPS
Filed June 30, 1932  4 Sheets-Sheet 4

INVENTOR
FREDERICK S. HODGMAN.
BY
Herbert H. Thompson
his ATTORNEY.

Patented Dec. 24, 1935

2,025,054

UNITED STATES PATENT OFFICE 2,025,054

COURSE CHANGING MEANS FOR AUTOMATICALLY STEERED SHIPS

Frederick S. Hodgman, Glen Rock, N. J., assignor to Sperry Gyroscope Company, Inc., Brooklyn, N. Y., a corporation of New York Application June 30, 1932, Serial No. 620,111

13 Claims. (Cl. 172—282)

This invention relates to the remote control of dirigible vessels, such as ships, and more especially to the remote control of the steering thereof. Automatic steering of ships (the gyro pilot) from gyroscopic compass baselines is now common practice and one object of the present invention is to devise a remote control which may be readily placed on a ship already equipped with such an automatic steering gear but without any one on board, for steering the same from the shore or another ship. According to the present invention an impulse step-by-step system of radio control is employed wherein one signal of predetermined characteristics will cause the ship to turn a predetermined amount, say 5 degrees, while if the signal is repeated, say ten times in succession, the course will be changed by ten times that amount or 50 degrees. By using a signal of different characteristics, for example of different wave length, a course change in the opposite direction may be effected in a similar manner. Very large course changes could not be effected in the average gyro-pilot and it is one object of the present invention to adapt the gyro pilot to making any predetermined course change without losing synchronism with the ship.

My invention also has application to the control of the ship's rudder by a very simple means, such as a push button system, which may operate in a manner similar to a radio controlled system except that a system of multiple signals is employed using ordinary push buttons and wires, one press of the right turn button operating to turn the ship through five degrees, for instance, two presses through ten degrees, etc. By such means the ship's course may be quickly changed by an observer in the fighting top to avoid the path of a sighted torpedo, thus saving the time necessary for the observer to transmit the information to the pilot house and for the pilot to turn the wheel from there.

For the complete control of a remote vessel, especially if the latter is out of sight, it is not only necessary for the remote operator to be able to change the course at will but also to know exactly what the control vessel is doing, i. e., its course and preferably also its speed. As a part of my invention, therefore, I propose to provide a radio sending device on the control vessel which broadcasts or transmits back to the controlling station the course and preferably also the speed of the control vessel. Preferably such a device is controlled from the same gyroscopic compass as is used as the baseline of the wireless controlled automatic steering gear.

Referring to the drawings,

Fig. 1 is a diagram showing how my invention is applied to a ship equipped with automatic steering gear.

Fig. 2 is a wiring diagram of the connections from the two controllers to the steering motor.

Fig. 3 is a wiring diagram of the course broadcasting device on the controlled vessel.

Fig. 4 is a development of the signal transmitting cam thereof.

Fig. 5 is a side view of said cam.

Fig. 6 is an end view thereof.

Fig. 7 is a wiring diagram of a portion of the ship's speed broadcasting device.

Figure 8:
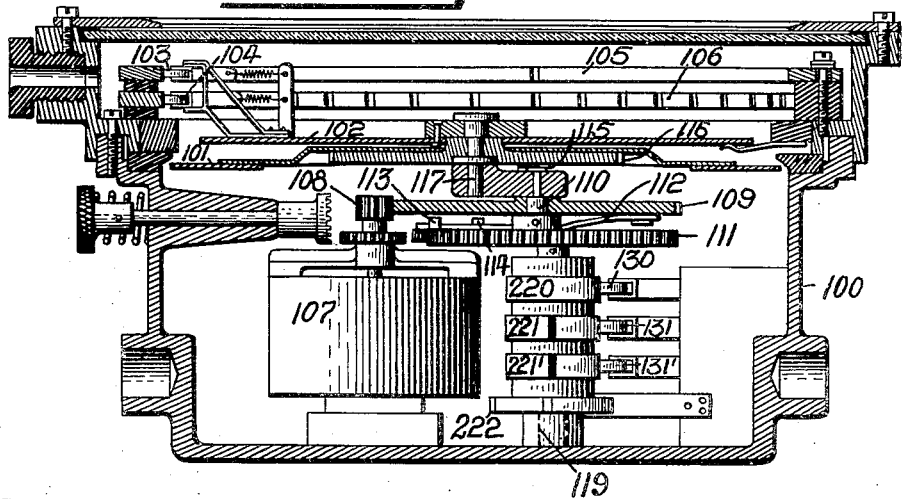
Fig. 8 is a vertical section of the repeater compass having the course broadcasting device control thereon.

Referring to Fig. 1, the parts of a standard automatic steering gear will be recognized in the drawings as follows:

The course-controlling repeater motor is shown at 1, said motor being actuated as usual from a transmitter 2 on a gyroscopic or other compass 3. The repeater motor actuates through gearing 4 one side of a differential gear train 5. The planetary arm 7 of said train drives the controller 9 through the usual lost motion device 8. Said arm also turns the course indicating pointer P. Said controller is shown as comprising the usual reversing contacts 10 and 11 and the trolley arm 12 (see also Fig. 2) having thereon the lower trolley 12' bearing on connector ring 13. As is usual in such controllers, the trolley arm is geared to rotate many times as fast as the ship turns, so that an accurate control is effected. The usual follow-up is provided by mounting the rings 10, 11, 13 in a rotatable member 14 driven by gear 15 from a pinion 16 on shaft 17. The usual telemotor lost motion is shown at 16'. The steering motor 20 for operating the rudder 19 is shown as connected to said lost motion device through reduction gear 21, throw-out clutch 22, reduction gear 23 and the pin and slot connection 24 between an arm 25 on shaft 26 and a slot in arm 27 on shaft 28. The connections from the motor 20 to the rudder are shown diagrammatically as a sprocket and chain connection 29 to the shaft 30 carrying the cable drum 31 which is connected to the rudder 19 through usual cable system 32. It will be understood that any suitable system may be employed from the motor to the rudder, either power multiplying or direct as desired. A large handwheel 33 may be provided for direct steering, if desired, at which time clutch 22 is thrown out by handle 33'. Course changing may also be manually effected through the main controller by a small handwheel 34 which turns through gearing 35 the third side 36 of said differential 5.

The gear so far described is intended merely to be illustrative of a typical automatic steering equipment for ships. In order to control the rudder from a distance at will, I prefer to employ an auxiliary controller 37 which preferably has a one-to-one relation to the movements of the ship controlled thereby instead of being geared up as is the controller 9. In other words, a 5-degree movement, for example of the trolley arm 38 thereof will cause a corresponding 5-degree turn of the ship. Control 37 may be referred to as a coarse or synchronous controller as distinguished from the high speed or fine controller 9. I have shown trolley arm 38 of the controller 37 as turned through reduction gearing 39 from the shaft 40 of trolley arm 12. Correspondingly, the mounting 41 for the contact rings 10', 11', 13' is turned through reduction gear 42 from the member 14 carrying the rings 10, 11 and 13. The two controllers are thus geared together in permanent relationship and both control the motor 20.

The arrangement is such, however, that the fine controller governs the motor 20 when the vessel is on or near its set course, while the coarse or synchronous controller takes over the control in case the vessel is more than a predetermined angle from its course, which angle is about equal to the angle through which the fine controller is synchronous. Such a result may be conveniently secured by the arrangement shown in Fig. 2. Motor 20 is here shown as provided with oppositely wound fields 46 and 46' to simplify the reversing connections. The controller 9 is provided with narrow insulation segments 47 between rings 10 and 11 and since it is geared up to the compass the trolley will be moved off the insulation segment upon slight deviation of the ship on to segment 10 or 11, thus sending current through the proper field 45 or 46 and the armature of the motor to run it in a direction to bring the ship back to its course. The trolley 38 of the coarse controller, on the other hand, is not moved off its insulation 48 at this time.

In case of a substantial course change or large deviation of the ship, trolley 12 may be moved around more than 180°. This will move the trolley arm 38 so that the upper trolley 38' contacts with one or the other of segments 10' or 11' while the lower trolley 49 is moved off of the short conducting segment 50 and on to the insulated inner portion 51 of the ring 13'. The outer portion of said ring, however, is provided with an annular conducting strip 53 on which bears a collector brush 54. With the trolley in the position shown in Fig. 2, the lead-in current for the controller 9 passes first through the trolley 49, then through the segment 50 and strip 53 to the brush 54. When, however, the trolley arm 38 is turned through an angle greater than the width of the strips 48 and 50, the circuit to controller 9 is interrupted at trolley 49 thus rendering the same ineffective. At the same time the circuit is made through the trolley 38' and one or the other of rings 10', 11' to one of the fields of the motor 20, thus driving it in the proper direction to bring the ship back near its course where the fine controller assumes control. In this manner accurate steering is retained while complete control is never lost through loss of synchronism between the controller and ship.

The radio or other remote control course-changing device may be brought in through the same shaft 55 to which the change-course wheel 34 is connected. As shown a clutch 56 is provided in the shaft 57 geared to the shaft 55 so that the remote control may be thrown in and out as desired by handle 56'. The extension 57' of said shaft may be turned from a small reversible servomotor 58 which is operated in accordance with the remote control signals. A conventional wireless receiving set is represented at 60 in which the antenna is shown at 61 and detector tube at 62. A plurality of oscillating circuits tuned to different frequencies may be connected thereto. One such circuit is shown at 45 and is tuned for a predetermined frequency so that when such frequency is received an output is delivered through suitable amplifying relay R to excite an electromagnet 63. A similar circuit 64 tuned to a different frequency energizes a relay R' and electromagnet 65. At the sending station S two buttons 66 and 66' are provided, one for turning right and the other for turning left and one sending out a signal of a frequency to energize magnet 63 and the other to energize magnet 65. Obviously magnets 63 and 65 could be excited directly from push buttons 92, 93 on the same ship, if desired, for trial purposes or as a new type of push button rudder control.

Upon excitation, magnet 63 completes a contact from one side of the line to contacts 67 and 68. The former operates to light a signal lamp 69 (for example, colored green) and to excite a lock-out relay 70. The latter contact 68 completes a circuit through a back-contact 71 on relay 70 to a right motor control relay 72 and thence through a back-contact 86 on left motor control relay 72' and thence to the other side of the line. A parallel circuit from contact 71 leads to a third or lock-in relay 74 and a lock-in contact 75 thereon.

From the lock-in relays 74 and 74' the current is led to the other side of the line through a contact 85 which is controlled by a speed-responsive or fly ball governor mechanism 88 on shaft 57'. Said contact is normally held closed by a spring 89 but when the shaft 57' is rotated the centrifugal balls raise the outer end of the lever 90 and open the switch.

Relays 72 and 72' operate to directly control the servomotor 58, and relay 72' is controlled in the same manner from magnet 65 through corresponding relays 70' and 74' and contact 85, corresponding parts being shown by the same reference numerals primed. Lamp 69' in this instance may be red. To simplify all circuits, the motor is shown with opposed series field windings 77, 77', although it will be understood that the motor may be reversed in any conventional manner through additional relays. Also some lock-out relays are omitted for the sake of clearness.

The energization of the relay 72 makes front contacts 76, thus closing a circuit from the negative side of the line through one field winding 77 of the motor 58, thus turning the motor in one direction. At the same time the excitation of lock-in relay 74 withdraws the latch 80 from a notch 81 in a disc 82 on shaft 57', thus permitting the shaft to be turned from the motor 58. However, the energization of the lock-out relay 70 (which is of the delayed action type) breaks the back contact 71 thus deenergizing the relay 74 immediately after the disc has started to rotate so that the latch 80 is ready to drop into the notch 81 under the influence of spring 182 as soon as the disc makes one revolution, in spite of the fact that the lock-in contact 75 has been closed, thus completing a direct circuit from the negative side of the line through magnet 74 and switch 85 and through magnet 72 and contact 86. Switch 85, however, has in the meantime been opened by the centrifugal governor, thus breaking the circuit through the magnet 74 and permitting contact 75 to be opened as soon as the notch is reached. At this point the circuit through coil 72 is broken and all switches restored to the original position ready for another impulse.

In other words, a single impulse from the key 66 will rotate shaft 57' through one complete rotation and no more, regardless whether the impulse is of long or short duration. On the other hand an impulse from the key 66' will operate in a similar manner through magnet 65, switches 67', 68', lock-out relay 70' and lock-in relay 74' and their attached switches, thus driving the motor 58 in the opposite direction by exciting the opposed field 77'. Motor 58 is preferably connected to shaft 57' through a slip friction clutch 90 so that when latch 80 or 80' falls into the corresponding notch on disc 82 or 82' the shaft 57' may be brought instantly to rest regardless of the momentum of the motor armature, the clutch 90' slipping at that time.

The operation of this part of my invention is as follows: A straight course is normally maintained from the gyro compass. Suppose that it is desired to change the course to the right by 45°. The operator then presses the right button 66 nine times (if the change course device operates on five degrees increments). This will cause nine successive actuations of the relays 63, 70, 72 and 74 and hence nine complete turns of the discs 81, latch 80 dropping into the notch 81 at the end of each turn and being withdrawn again by the next impulse. The accuracy of the turn will not be interfered with by any unevenness in sending impulses as long as they are not sent faster than the time increment for the disc 82 to make one revolution. As this may be made very short, say one-third second, the operator need only avoid extremely rapid sending in order to avoid confusing of signals. No matter how short or how long each impulse may be, the disc 82 is only rotated through one revolution. In case of a short impulse, a complete revolution is assured by the lock-in relay contact 75 and the fact that the contact 85 is not opened until the shaft 57' is rotated through an appreciable angle to come up to speed. A long impulse will not effect any greater rotation of the disc 82 on account of the lock-out relay contact 71 which breaks the main circuit immediately after relay 74 is excited. A left turn would, of course, be made by operation of the key 66' and interference by a hostile sending station could be prevented by holding down both of the keys which prevents any operation of the change course mechanism and keeps the ship on its original course.

Figure 9:
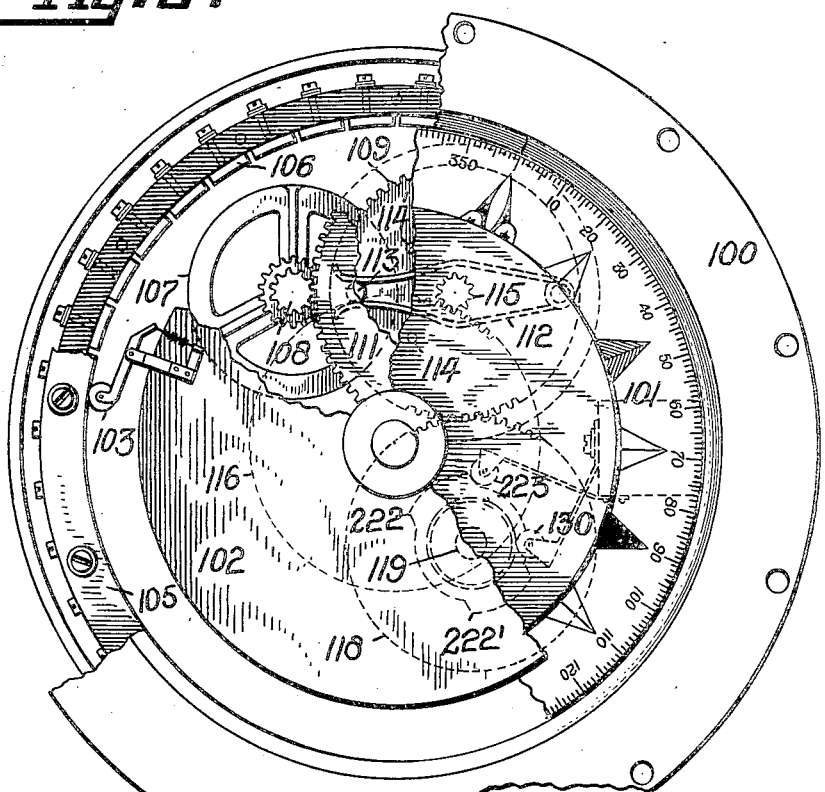
Fig. 9 is a plan view of the same with a portion of the card and top broken away.

As above stated, I prefer to control the device for broadcasting the ship's course from the same compass 3 used as a baseline for the automatic steering device. To this end I provide a special repeater compass 100 driven from a transmitted 2 on the compass 3 (Fig. 1) and shown in detail in Figs. 8 and 9. The card 101 of said repeater compass is provided with a special plate 102 on which is mounted a pair of spring pressed brushes or trolleys 103—104. Trolley 103 is shown as engaging a split ring 105 having four segments 120, 121, 122, and 123 (the first three for one hundred degrees each and segment 123 for sixty degrees), while the trolley 104 engages a plurality of segments 106 spaced every few degrees, say every 10 degrees, around the periphery of the casing. The compass card and plate 102 are maintained in the same position as the master compass by repeater motor 107 which may be geared to the card through a plurality of reduction gears shown as comprising a pinion 108 on the shaft of the repeater motor which meshes with a gear 109 loosely mounted on a shaft 110. Secured to shaft 110 is a second gear 111 which is connected to the gear 109 through a spring fork 112 pinned at its center to gear 109 and having its outer ends engaging around a pin 113 on the gear 111. Gear 111 is also provided with a pair of fixed stops 114—114' which engage one or the other side of the spring fork after a predetermined displacement between the two gears. Also mounted on the shaft 110 is a pinion 115 which meshes with a gear 116 on the shaft 117 of the repeater card 101 and plate 102. Also meshing with gear 111 is a gear 118 on the shaft 119 of which are mounted a plurality of contact rings 220, 221, and 221', each having a cooperating trolley 130, 131, and 131', and also a cam surface 222, against which bears a spring-pressed roller 223. It will be seen, therefore, that the shaft 119 rotates much faster than the shaft 117, the ratio preferably being 36 to 1. Each section of commutators 221 and 221' corresponds to 5°, which, for purposes of illustration, is taken as the smallest unit change it is desired to broadcast. Spring arm 112 cooperates with spring finger 223 in preventing the trolleys 104 and 103 from stopping mid-way between any two segments 106 or those on 105 and for preventing trolleys 131 and 131' from stopping on the insulated sections of commutators 221, 221'. Owing to the yielding connection and the temporary stopping action of the spring finger 223 against one of the cam surfaces 222, 222', the shaft 119 is held stationary as the repeater motor 107 revolves until the strength of the spring 112, as increased by contact with pin 114—114' causes the cam to snap past the roller 223, the trolleys 103 and 104 being then thrown on the next sector 106 and the trolleys 131, 131' across to the opposite sector. Cam 222' acts similarly to prevent trolleys 131, 131' from stopping on the opposite insulated section.

Referring now to the wiring diagram in Fig. 3, it will be seen that section 120 of ring 105 is a silent section, as this corresponds to zero to 90 degrees. Section 121, which is designed to transmit signal "100" for angles from 100 to 190 degrees, is connected to a brush 125 on a continuously rotated commutator element 126, while segment 122, designed to transmit from 200 to 290 degrees, is connected to a second brush 127 of said commutator, and the last segment 123 which transmits from 300 to 350 degrees is connected to a third brush 128 of said commutator. It should also be noted that the ten degree sectors of commutator 106 are arranged in three groups ranging from zero to 90 degrees each, and a fourth group of from zero to 50 degrees. It should also be noted that the first sector 124 of commutator 106 is silent.

Commutators 221 and 221' which are driven at 36 to 1 speed are each divided into two halves, one half corresponding to 0° and the second half to 5°. Going in a counter-clockwise direction from sector 124 it will be noted that a silent portion 120 of the 100° ring 105 lies thereunder for somewhat more than 90° so that commutator 106 only is effective. Beyond this, however, both commutators 105 and 106 are effective to transmit both hundreds and tens. It will be understood that the device is so designed that while the trolley 104 is on the first half of each tens sector, the trolleys 131 and 131' lie first on the zero or blank half of the commutators and then on the five degree or live section of the commutators.

To enable these brushes and commutators to transmit suitable signals through a wireless sending instrument, each sector in the arrangement above indicated is connected to a brush or trolley 135 on the aforesaid commutating cylinder 126. Like contacts in each of the aforesaid groups are connected in parallel to the same brush so that the same contact of each group will send out the same signal, that is to say, the 20° sector 171 (for instance) in one group is connected to the same brush 175 as the sectors 172, 173 and 174 so it actuates the same signal as 20° in any of the other groups for 20°, 120°, 220°, and 320°. On the surface of this cylinder are provided long and short projections 137 as the case may be corresponding to the dashes and dots of the telegraphic code, which, as the roller or cylinder rotates, are adapted to engage the spring-pressed trolleys, one of which cooperates with each section of the commutator. When a projection engages a trolley, the latter closes a contact 140 to close the circuit through a transmission system to send a long or short signal or sequence of signals as the case may be. The entire course is adapted to be transmitted once in one revolution of the contact carrying cylinder so that it is necessary to position the signals 141 corresponding to hundreds in advance to the signals 142 corresponding to tens, which in turn are positioned in advance of the signals 143 corresponding to units within a single circumference (see Fig. 4). Since only one of the hundreds, one of the tens, and one of the unit commutator segments can be in engagement with their respective brushes at any one time, only one of the hundreds designations, one of the tens designations, and one of the unit designations can be transmitted in succession for any single rotation of the cylinder.

I prefer, however, to transmit not only course but also the speed of the vessel. To this end, I have shown the controller handle 150, which governs the throttle valve or accelerator of the engines, as provided with a contact 150'' adapted to engage a series of contacts 151, 152, 153, and 154 for the different settings of the throttle. Throttle valve 150 is designed to be controlled by wireless means (not shown) from the sending station, and the position of this valve is broadcast by means of the aforesaid contacts, one of which, for instance, may be for stop, one for one-third speed ahead, one for two-thirds speed and one for full speed ahead. Each contact is in circuit with a relay 151', 152', 153' and 154', each of which controls a contact in circuit with a selector switch 155. Said switch is preferably geared to the cylinder 126 so as to rotate at a slower speed, say 1 to 4, through gear 156 and pinion 157. Said selector switch has approximately a 90° sector 158 which is silent, and another 90° sector 159 which is in series with the trolleys 103—104 and 130 so that when the trolley 155' of the switch 155 is on sector 159, the course is being transmitted for one revolution of the cylinder 126. Sector 160 is shown as in series with switch 151'', sector 161 in series with switch 152'', sector 162 with switch 153'', and sector 163 with switch 154''. Therefore, when the trolley is on these sectors, the speed of the vessel will be transmitted. These switches are connected to two special segments 165 and 166 at the left hand end of the cylinder 126 to transmit the speed of the vessel. A motor M is shown for continuously rotating the cylinder.

Each annular segment is provided with two series of cams instead of one as is the case with the course sending segments so that for one revolution of the cylinder it is possible to send out two signals, such as second and high speeds. The commutator 155 and the switches 151'', etc., however, select which segment shall be energized and which group of contacts on each segment, since each sector 160, 163 is about 45° in extent and, therefore, corresponds to one half revolution of the cylinder 126. As the trolley 155' revolves, it first contacts with the silent segment 158, during which time no signal is transmitted for one complete revolution of the drum 126. It then contacts with segment 159 so that the course is transmitted once for a complete rotation of the drum 126. It then contacts with 45° segment 160. If at that time the ship is stopped so that contact 151' is energized, this signal will be sent out through brush 165' and one half of the segment 165. By the time the cylinder 126 turns past the half-way mark, however, to reach the second set of signal cams 166, trolley 155' has reached contact 161. Therefore, no signal is sent out for the remainder of the revolution of the cylinder 126. Hence it will be apparent that the complete course and speed of the vessel are sent out for each four revolutions of the cylinder 126. The impulses received from the above described arrangement may be amplified and broadcast through any suitable wireless sending set illustrated diagrammatically at 170.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a push button or impulse control for the steering of ships, a course change device, means responsive to the receipt of a single electrical impulse of indeterminate duration, for starting said device in one direction, and means for stopping said device after turning through a predetermined angle, said stopping means being independent of whether said original impulse has stopped or is continuing.

2. In a push button or impulse control for the steering of ships, a course maintaining means, a course change device operating through said means, means responsive to the receipt of successive electrical impulses of indeterminate duration for turning said device in one direction through an angle proportional to the number of impulses received, and means for stopping said device after turning through said angle whereby the ship's heading is changed by the same angle as said device is turned.

3. In a radio-controlled means for automatically steered ships, the combination with the usual automatic steering gear including a high speed master controller and a course changing device, of remotely controlled means for changing course including a slow speed or one to one auxiliary controller also connected to said device, radio controlled means for turning said course changing device to thereby turn said auxiliary controller through the angle by which the course is to be changed and also the master controller in the proper ratio, and a power means governed jointly by both controllers for steering the ship.

4. In a push button control for the steering of ships, the combination with a standard automatic steering gear including a fine controller and manual course changing device, of an auxiliary coarse or self-synchronous controller geared to said fine controller, an electrical, remote control course changing device connected to said manual device, two groups of impulse responsive relays for causing said electrical device to turn the course changing device in opposite directions, and an actuating switch for each group for right and left turns, said relays operating to cause a predetermined angular turn of said device per impulse received.

5. In a radio-controlled means for steering ships from a distance, a fine controller, a coarse controller, compass means for normally operating both controllers, and wireless controlled means for altering the relation between said compass and both of said controllers for changing course.

6. In a radio-controlled means for steering ships from a distance, a fine controller, a coarse controller, compass means for normally operating both controllers, and radio controlled means for rotating the coarse controller through the course change angle and the fine controller in proportion.

7. In a push button or impulse control for changing course in an automatically steered ship, a synchronous or coarse controller normally fixed in azimuth from a compass, and a course changing device for turning said controller through the course change angle, including means responsive to successive impulses of one kind for turning said device through a predetermined small angle in one direction for each impulse, means responsive to successive impulses of another kind for opposite turning of said device through a predetermined small angle for each impulse, and means for assuring the turning of said device through such angle regardless of the length of the impulse.

8. In a push button or impulse control for changing course in an automatically steered ship, a synchronous or coarse controller normally fixed in azimuth from a compass, and a course changing device for turning said controller through the course change angle, including means responsive to successive impulses for turning said device through a predetermined small angle per impulse, and means for assuring the turning of said device through such angle regardless of the shortness of the impulse including a lock-in relay actuated upon receipt of the impulse and means for preventing the circuit completed thereby from opening until after said turning means has started.

9. In a push button or impulse control for changing course in an automatically steered ship, a synchronous or coarse controller normally fixed in azimuth from a compass, and a course changing device for turning said controller through the course change angle, including means responsive to successive impulses for turning said device through a predetermined small angle per impulse and means for assuring the turning of said device through such angle regardless of the length of the impulse, including a primary relay, a lock-out relay for breaking the circuit completed by the primary relay after said circuit is made, a lock-in relay closed before said circuit is broken, and means independent of said primary relay for breaking the circuit of said lock-in relay.

10. In a system for the remote control of crewless dirigible vehicles or other objects, a direction maintaining device on said vehicle, automatic means for steering the vehicle from said device, radio means controllable from a distance for changing the course, and radio means on said vehicle also controlled by said device for broadcasting the course of the vehicle.

11. In a system for the remote control of crewless dirigible vehicles or other objects, a direction maintaining device on said vehicle, automatic means for steering the vehicle on any predetermined course from said device, radio means controllable from a distance for changing the course through a predetermined angle, and radio means on said vehicle also controlled by said device for broadcasting the course of the vehicle.

12. In a system for the remote control of crewless dirigible vehicles or other objects, a direction maintaining device on said vehicle, automatic means for steering the vehicle from said device, radio means controllable from a distance for changing the course, radio means on said vehicle also controlled by said device for broadcasting the course of the vehicle, and radio means associated with said first-named radio means for broadcasting the speed of the vehicle.

13. In a radio-controlled means for automatically steered ships, the combination with the usual automatic steering gear including a high speed master controller and a course changing device, of remotely controlled means for changing course including a slow speed or one to one auxiliary controller also connected to said device, radio controlled means for turning said course changing device to thereby turn said auxiliary controller through the angle by which the course is to be changed and also the master controller in the proper ratio, and a power means governed jointly by both controllers for steering the ship, the circuit for the high speed controller passing through the one to one controller so as to be interrupted when the former exceeds the limits of self synchronism.

FREDERICK S. HODGMAN.